US010258052B2

(12) United States Patent
van den Berg et al.

(10) Patent No.: US 10,258,052 B2
(45) Date of Patent: Apr. 16, 2019

(54) METHOD AND DEVICE FOR LONGITUDINALLY CUTTING POULTRY LEGS ALONG A CONTOUR DEFINED BY AN INWARDLY EXTENDING BONE STRUCTURE

(71) Applicant: Foodmate B.V., Numansdorp (NL)

(72) Inventors: Juul Floris van den Berg, Numansdorp (NL); David Scott Hazenbroek, Numansdorp (NL)

(73) Assignee: Foodmate B.V., Numansdorp (NL)

( * ) Notice: Subject to any disclaimer, the term of this patent is extended or adjusted under 35 U.S.C. 154(b) by 0 days.

(21) Appl. No.: 16/074,650

(22) PCT Filed: Jan. 25, 2017

(86) PCT No.: PCT/NL2017/050048
§ 371 (c)(1),
(2) Date: Aug. 1, 2018

(87) PCT Pub. No.: WO2017/131516
PCT Pub. Date: Aug. 3, 2017

(65) Prior Publication Data
US 2019/0037863 A1 Feb. 7, 2019

(30) Foreign Application Priority Data
Jan. 26, 2016 (NL) .................................. 2016159

(51) Int. Cl.
*A22C 21/00* (2006.01)
*A22B 7/00* (2006.01)
*A22B 5/00* (2006.01)

(52) U.S. Cl.
CPC ........ *A22C 21/0023* (2013.01); *A22B 5/0029* (2013.01); *A22B 7/002* (2013.01); *A22C 21/0007* (2013.01); *A22C 21/0053* (2013.01)

(58) Field of Classification Search
CPC . A22C 21/00; A22C 21/0023; A22C 21/0038; A22C 21/0053; A22C 21/0069; A22C 21/0076; A22C 21/0084
(Continued)

(56) References Cited

U.S. PATENT DOCUMENTS 5,228,881 A    7/1993   Sekiguchi
5,542,879 A *  8/1996   Kunig ................ A22C 21/0076
                                                           452/135
(Continued)

FOREIGN PATENT DOCUMENTS

EP    2 153 727    2/2010
EP    2 404 505    1/2012

OTHER PUBLICATIONS

International Search Report and Written Opinion in PCT/NL2017/050048 dated Mar. 21, 2017.
(Continued)

*Primary Examiner* — Richard T Price, Jr.
(74) *Attorney, Agent, or Firm* — Womble Bond Dickinson (US) LLP (57) ABSTRACT

Method and apparatus (1, 11) for longitudinally cutting poultry legs along a contour defined by an inwardly extending bone structure. The method comprises the steps of, and the apparatus (1, 11) having means (25) for, suspending at least one poultry leg at its ankle joint, and conveying the thus suspended poultry leg along a predefined path of conveyance (21). At least one cutting unit (1) with a directionable knife (73) is provided in the predefined path of conveyance (21). The at least one poultry leg is positioning such that it is lined-up for a longitudinal cutting engagement by the directionable knife (73), and the directionable knife (73) is brought into cutting engagement with the thus positioned poultry leg. During cutting engagement, position and cutting direction of the directionable knife are continuously adjusted
(Continued)

to follow the contour defined by the bone structure of the poultry leg, while the positioned poultry leg is conveyed past the directionable knife (73).

21 Claims, 10 Drawing Sheets

(58) Field of Classification Search
USPC ........ 452/149, 150–157, 160, 163, 166, 170
See application file for complete search history.

(56) References Cited

U.S. PATENT DOCUMENTS

| | | | |
|---|---|---|---|
| 6,899,613 B2 * | 5/2005 | van den Nieuwelaar et al. | ..........<br>A22B 3/005<br>452/63 |
| 8,491,362 B2 * | 7/2013 | Kodama | ............ A22C 21/0076<br>452/136 |
| 9,004,988 B2 * | 4/2015 | Van Der Steen | ...... A22B 5/007<br>452/125 |

OTHER PUBLICATIONS

Communication in EP Patent Application No. 17704836.0 dated Sep. 7, 2018.
International Search Report and Written Opinion in International Patent Application No. PCT/NL2017/050048 dated Mar. 21, 2017.
International Preliminary Report on Patentability in International Patent Application No. PCT/NL2017/050048 dated Jul. 31, 2018.

* cited by examiner

METHOD AND DEVICE FOR LONGITUDINALLY CUTTING POULTRY LEGS ALONG A CONTOUR DEFINED BY AN INWARDLY EXTENDING BONE STRUCTURE

TECHNICAL FIELD

The invention relates to a method and device for longitudinally cutting poultry legs along a contour defined by an inwardly extending bone structure.

BACKGROUND

Methods and devices for making a preparatory incision longitudinally of poultry legs are generally known. Document EP 0 594 934 A2 for example discloses a device for making a preparatory incision longitudinally of a chicken leg having an internal bone structure surrounded by meat. The device includes elongate linear guides, a cutting unit associated with the elongate linear guides for translating movement lengthwise thereof. The cutting unit includes a cutting knife mounted for movement between a first position and a second position in a first plane. A conveyor is arranged for transporting chicken leg through a path coincident with the cutting unit. The device further includes a drive mechanism for moving the cutting unit lengthwise of the elongate linear guides, and for moving the cutting knife for performing the preparatory incision on the animal extremity part in the cutting unit. A drawback of such a device is that it is not very accurate and can only approximate a perfect cut.

Accordingly it is an object of the present invention to propose an improved method and device for longitudinally cutting poultry legs along a contour defined by an inwardly extending bone structure. In a more general sense it is thus an object of the invention to overcome or reduce at least one of the disadvantages of the prior art. It is also an object of the present invention to provide alternative solutions which are less cumbersome in assembly and operation and which moreover can be made relatively inexpensively. Alternatively it is an object of the invention to at least provide a useful alternative.

SUMMARY

To this end the invention provides for a method and a device for longitudinally cutting poultry legs along a contour defined by an inwardly extending bone structure, as defined in the appended claims.

The invention covers a method and apparatus for longitudinally cutting poultry legs along a contour defined by an inwardly extending bone structure. The method comprises the steps of, and the apparatus having the necessary means for, suspending at least one poultry leg at its ankle joint, and conveying the thus suspended poultry leg along a predefined path of conveyance. At least one cutting unit with a directionable knife is provided in the predefined path of conveyance. The at least one poultry leg can be positioning such that it is lined-up for a longitudinal cutting engagement by the directionable knife, and the directionable knife is adapted to be brought into cutting engagement with the thus positioned poultry leg. During cutting engagement, position and cutting direction of the directionable knife are continuously adjusted to follow the contour defined by the bone structure of the poultry leg, while the positioned poultry leg is conveyed past the directionable knife. In the method the step of adjusting the directionable knife may optionally comprises angularly rotating the directionable knife so that a cutting edge of the directionable knife can follow an angular direction at which the bone structure extends within the at least one poultry leg. In such a method the directionable knife can be moved laterally in respect of the predefined path of conveyance in a direction towards and into the at least one poultry leg to achieve cutting engagement with the at least one poultry leg. Optionally the directionable knife can be moved linearly and perpendicular to the path of conveyance to meet the bone structure.

The at least one poultry leg may optionally be positioned horizontally or substantially horizontally, while the directionable knife can be adjusted vertically.

The at least one poultry leg can also be suspended from a shackle, and preferably the at least one poultry leg is pivoted around its ankle joint inside the shackle for allowing positioning thereof. In association with this option a step can be included of guiding the shackle along the path of conveyance to prevent lateral movement of the shackle during the positioning the at least one poultry leg.

The apparatus covered by the invention is suitable for longitudinally cutting poultry legs along a contour defined by an inwardly extending bone structure, and comprises suspension means for suspending at least one poultry leg at its ankle joint, a conveyor for conveying the at least one poultry leg suspended from the suspension means along a path of conveyance towards at least one cutting unit comprising a directionable knife. Further the apparatus of the invention includes at least one leg guide for aligning the at least one poultry leg for cutting engagement by the directionable knife, with the directionable knife arranged for following the bone structure contour when the at least one poultry leg is conveyed past the directionable knife. In such an apparatus the directionable knife can optionally be angularly rotatable effective for a cutting edge of the directionable knife to follow an angular direction at which the bone structure extends within the at least one poultry leg.

Optionally in the apparatus according to the invention the directionable knife can be arranged on a pivoting arm connected to an arm drive mechanism, and the directionable knife then preferably extends from a lateral side of pivoting arm.

Also in the apparatus of the invention the at least one cutting unit can be connected to a linear actuator, which is arranged for moving the at least one cutting unit and thereby linearly moves the directionable knife in a direction perpendicular to the path of conveyance.

According to another optional aspect of the invention the at least one leg guide can be arranged for positioning the at least one poultry leg substantially or generally horizontally, and the directionable knife the preferably can be arranged for being vertically adjustable to meet the then horizontally positioned at least one poultry leg.

The suspension means may optionally include a shackle, and the shackle is then preferably arranged for carrying the at least one poultry leg in a manner that permits the at least one poultry leg to be pivotable about its ankle joint when carried by the shackle. In such an arrangement the shackle can comprise a vertical shaft, and the vertical shaft can then be guided between opposite shackle guides for preventing lateral movement of the shackle when positioning the at least one poultry leg.

The at least one leg guide of the apparatus of the invention can optionally also comprises an entrance guide rod arranged for being resiliently biased towards an opposite guide plate for, in use, exerting a positioning force against the at least one poultry leg. The at least one leg guide can also comprises first and second leg guides that are arranged for respectively receiving a first and second poultry leg, and the each of the first and second leg guides is preferably associated with a respective primary and secondary cutting unit downstream of one another in the path of conveyance. Alternatively the secondary cutting unit can be positioned downstream of the primary cutting unit at a pitch distance that is equal to at least a spacing between successive shackles of the conveyor.

The at least one cutting unit of the apparatus of the invention is advantageously provided with a cutter drive unit for rotating the angularly rotatable knife. The at least one cutting unit can further comprises an angularly movable arm, which has the angularly rotatable knife positioned at a distal end thereof, and an arm pivot drive mechanism can be arranged for angularly pivoting the arm.

Advantageously the at least one cutting unit of the apparatus can be carried on a sub-frame for lateral movement transverse to the path of conveyance, and can comprise a linear actuator also carried on the sub-frame for achieving, in use, cutting engagement of the directionable knife with the at least one poultry leg.

The at least one cutting unit of the apparatus can be one of a primary cutting unit and a secondary cutting unit, which are then preferably arranged downstream of one another in the path of conveyance.

Advantageous aspects of the invention will also become clear from the appended description and in reference to the accompanying drawings, in which:

DETAILED DESCRIPTION

Figure 1:
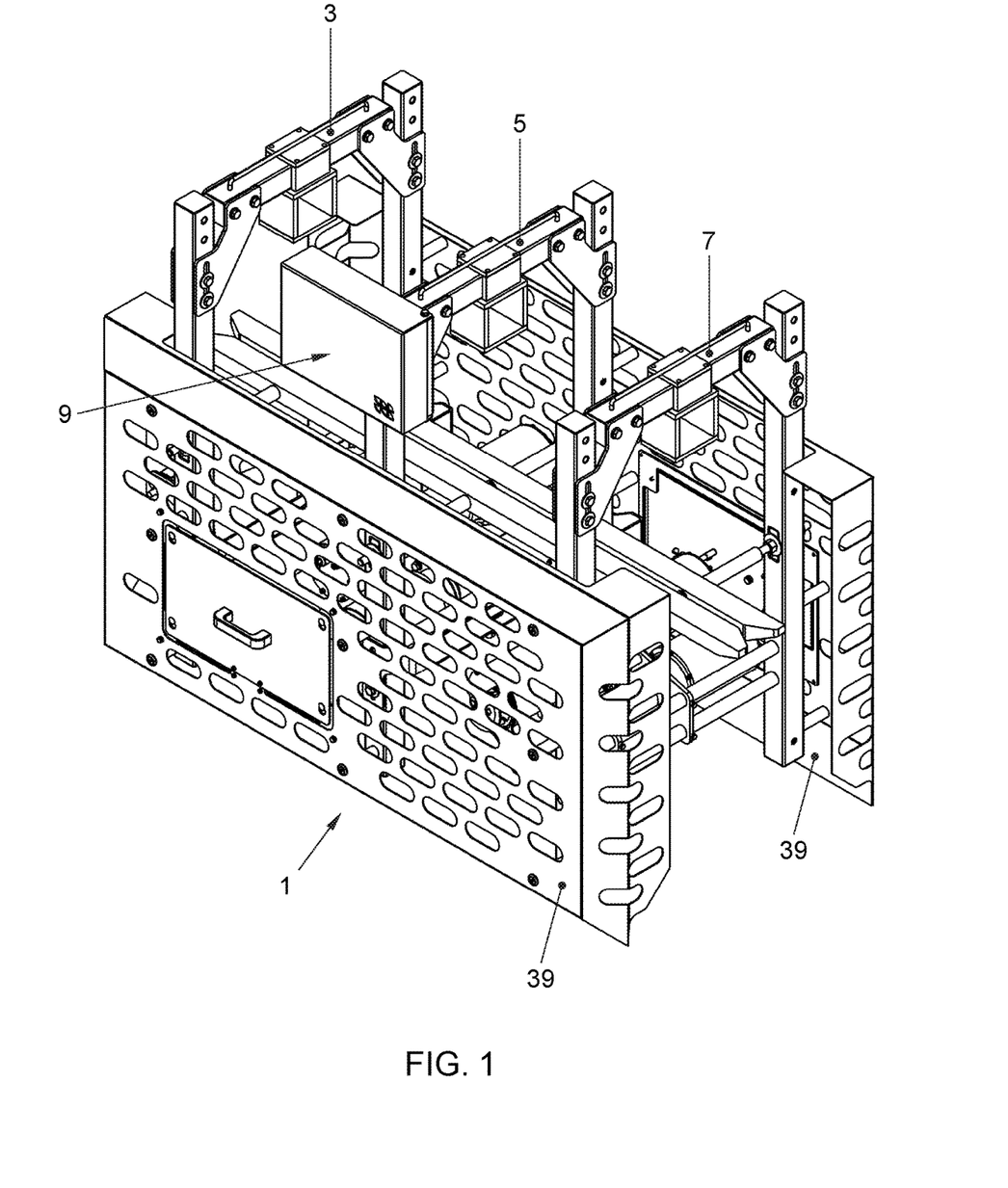
FIG. 1 is an isometric view of a poultry leg cutting unit in accordance with the invention.

As shown in FIG. 1 a poultry leg cutting unit 1 is provided with overhead frame portals 3, 5, 7 for attachment to a conveyor system of a poultry processing plant (not shown but conventional). The leg cutting unit 1 is also provided with a control box 9 for controlling its operation.

Figure 2:
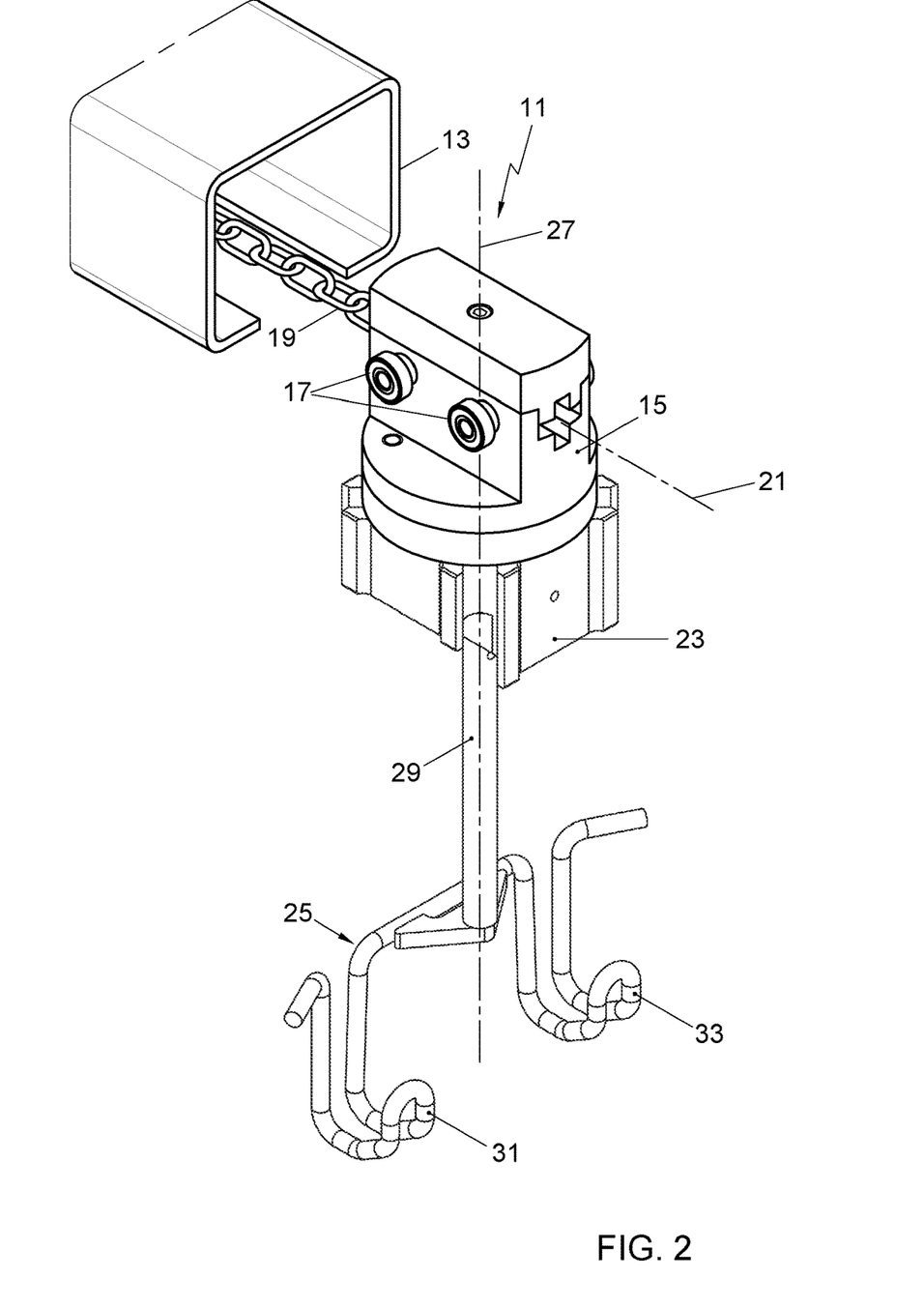
FIG. 2 is an isometric view of an overhead conveyor having a depending shackle.

A portion of a suitable overhead conveyor system 11 is shown in FIG. 2. The overhead conveyor system 11 comprises an overhead conveyor track 13 for guiding and supporting a carrier 15, which has rollers 17 supported on inwardly turned flanges of the conveyor track 13. Several carriers 15 (only one being shown) are interconnected by a conveyor chain 19, which is moved through a conveyor path schematically identified by dash-dotted line 21. Each carrier 15 has a turning block 23 from which a shackle 25 depends. The turning block 23 allows the shackle 25 to be rotated with respect to the carrier 15 about a vertically extending axis 27. This is a well known type of indexable shackle commonly in use in poultry processing plants and does not require further explanation. The shackle 25 has a vertical shaft 29 and pair of first and second shackle hooks 31, 33 for holding the ankle parts of the legs of a poultry carcass.

The shackles 25 of a conveyor system 11 as shown in FIG. 2 will pass below the frame portals 3, 5, 7 of the leg cutting unit 1 shown in FIG. 1.

Figure 3:
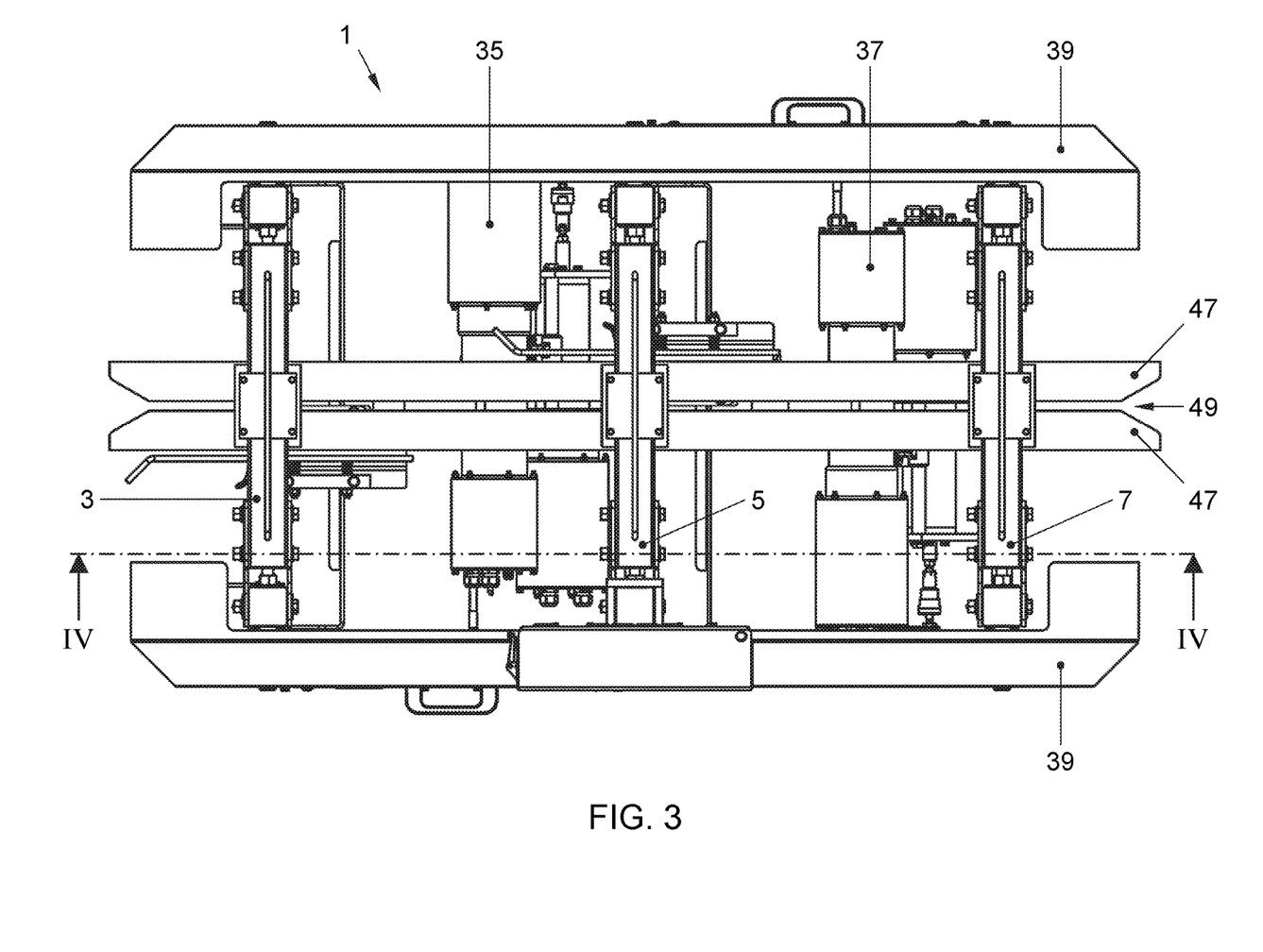
FIG. 3 is a plan view from above of the leg cutting unit of FIG. 1.

It is further seen that the leg cutting unit 1 as seen from above in FIG. 3 has a primary cutting unit 35, and a secondary cutting unit 37. Door panels 39 on each lateral side of the leg cutting unit 1 provide protection but can be opened or removed to allow access to the cutting units.

Figure 4:
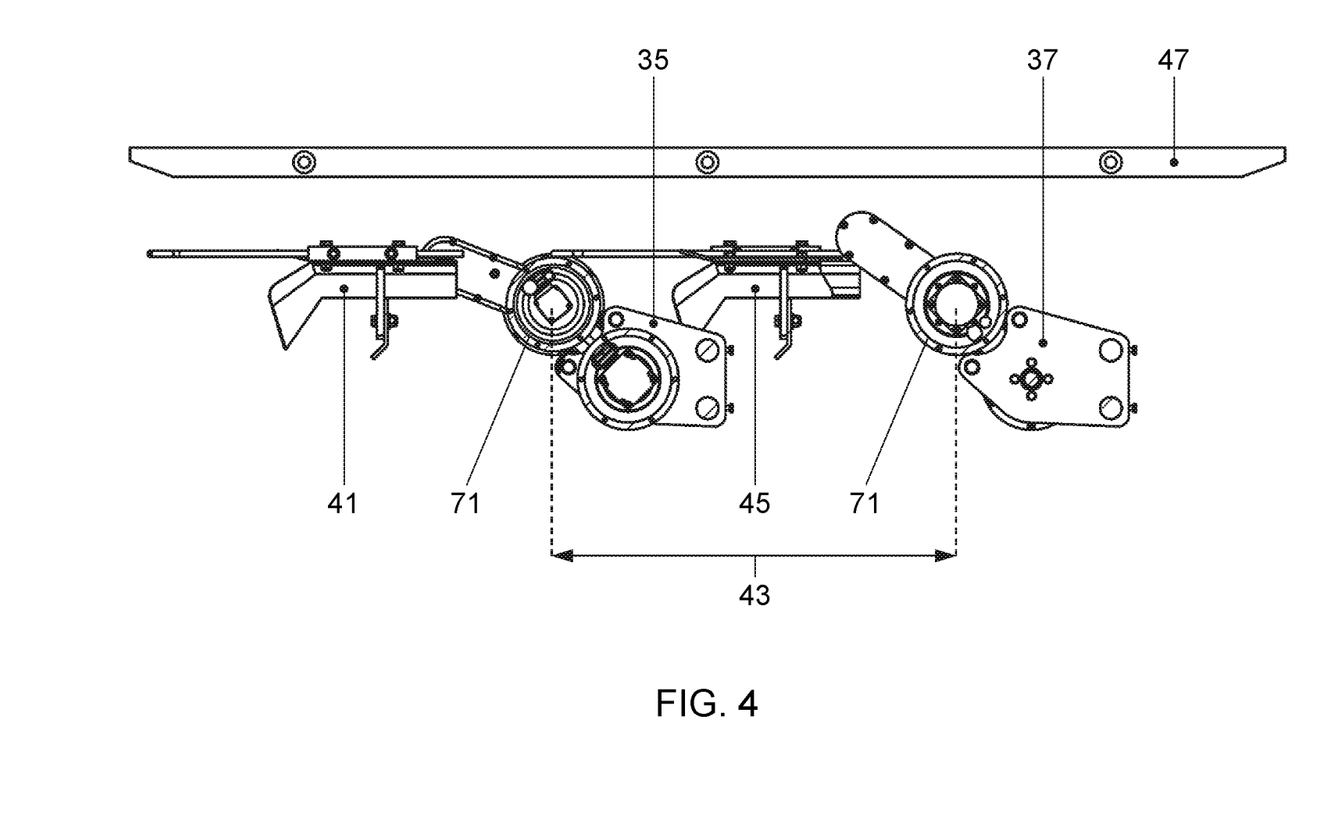
FIG. 4 is a partial cross section view in accordance with the line IV-IV of FIG. 3.

As seen in FIGS. 1 and 2, the shackles 25 of the conveyor system 11 of FIG. 2 will enter the leg cutting unit 1 form the left, and exit on the right hand side. As such, and as shown in FIG. 4, a first poultry leg carried by one of the first and second hooks 31, 33 engages a first leg guide 41. The first leg guide 41 positions the first leg with respect to the primary cutting unit 35. The secondary cutting unit 37 is positioned downstream of the primary cutting unit 35 at a pitch distance 43. The secondary cutting unit 37 is again preceded by a second leg guide 45, which positions a second poultry leg in the other of the first and second shackle hooks 31, 33 with respect to the secondary cutting unit 37. Opposite shackle guides 47 define an elongate slot 49 there between (see FIG. 3) for guiding the vertical shaft 29 of the shackle 25. The ankle knuckles of the poultry legs can pivot in the shackle hooks 31, 33 so that each of the legs can assume a more or less horizontal position in the relevant first or second leg guide 41, 45.

Figure 5:
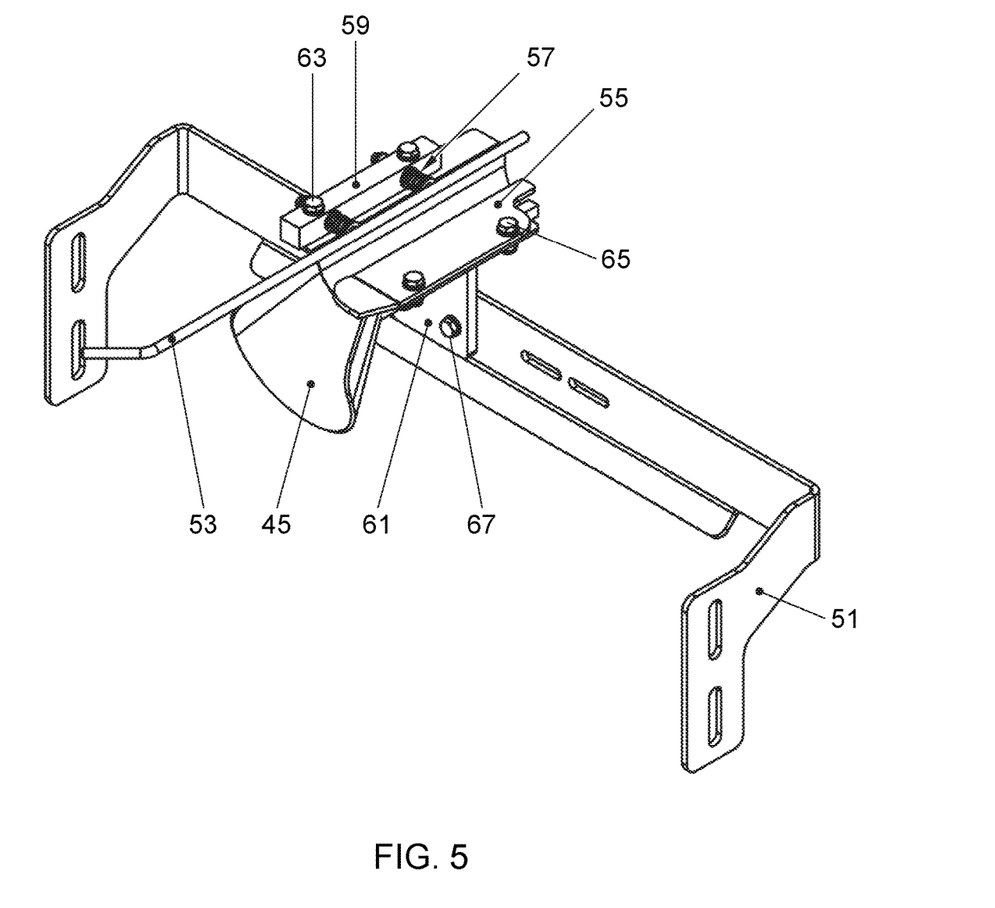
FIG. 5 is an isometric view of a leg guiding assembly.

FIG. 5 shows a typical leg guide, in this case the second leg guide 45. The first leg guide 41 is substantially identical, except for its lateral position on the transverse bracket 51. The second leg guide 45 is further seen to have an entrance guide rod 53. The entrance guide rod 53 is resiliently biased towards a guide plate 55, by means of compression springs 57. The compression springs 57 are mounted on a guide rod block 59. The guide plate 55 and the guide rod block 59 are mounted to a leg guide base 61 by means of conventional fasteners 63, 65. The leg guide base 61, itself is attached to the transverse bracket 51 by means of further fasteners 67. The transverse bracket 51 is mounted in the leg cutting unit 1 in a suitable conventional manner.

Figure 6:
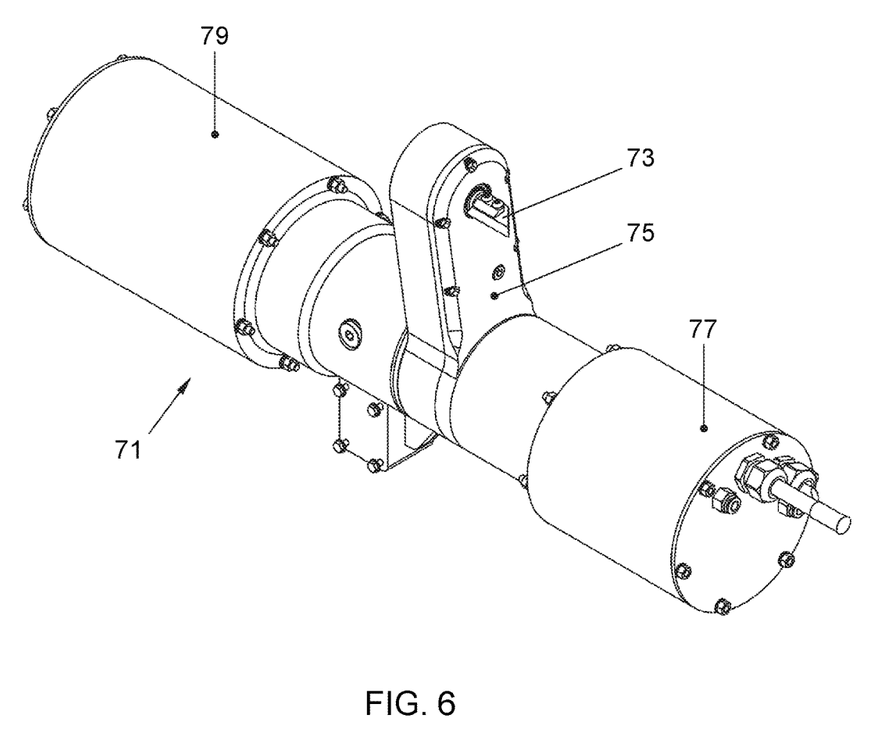
FIG. 6 is an isometric view of a cutter drive unit.

In FIG. 6 a cutter drive unit 71 is shown. The cutter drive unit forms a part of each of the primary and secondary cutting units 35, 37. That is to say that each of primary and secondary cutting units 35, 37 includes one identical example of the cutter drive unit 71. The cutter drive unit 71, as in FIG. 6, includes an angularly rotatable knife 73. The angularly rotatable knife 73 is positioned on an angularly movable arm 75, which is integral with a motor housing 77. Motor housing 77 accommodates a drive mechanism that angularly adjusts the cutting direction of knife 73. A further drive mechanism 79 for pivoting the arm 75 is contained in a further housing. The further drive mechanism 79 angularly pivots the arm 75 to adjust the vertical position of the knife 73. With respect to the respective first or second leg guide 41, 45. By a coordinated movement of the conveyor system 11, the arm 75, and the cutting angle of the knife 73 it is accurately possible to cut a poultry leg along its bone contour. Such a cut in the poultry processing trade is referred to as a J-cut.

Figure 7:
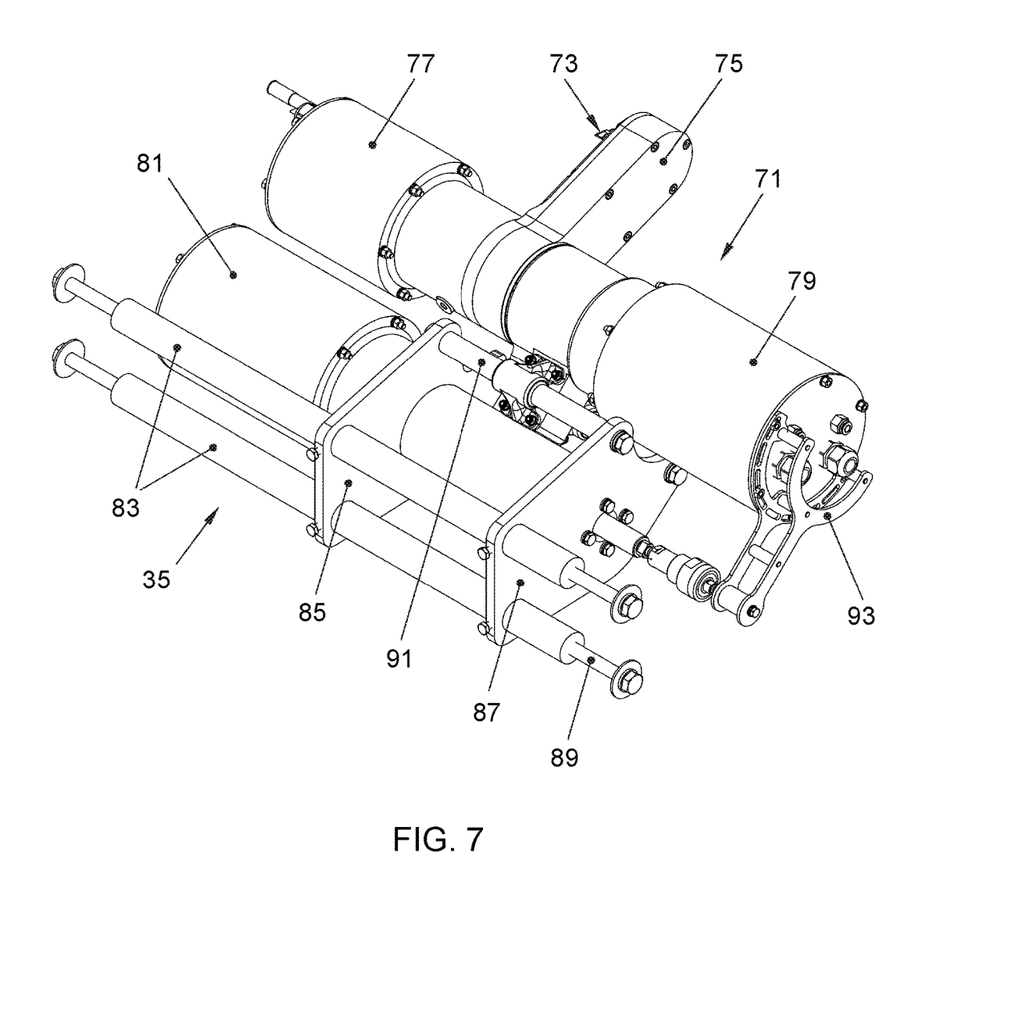
FIG. 7 is a primary cutter unit.
Figure 8:
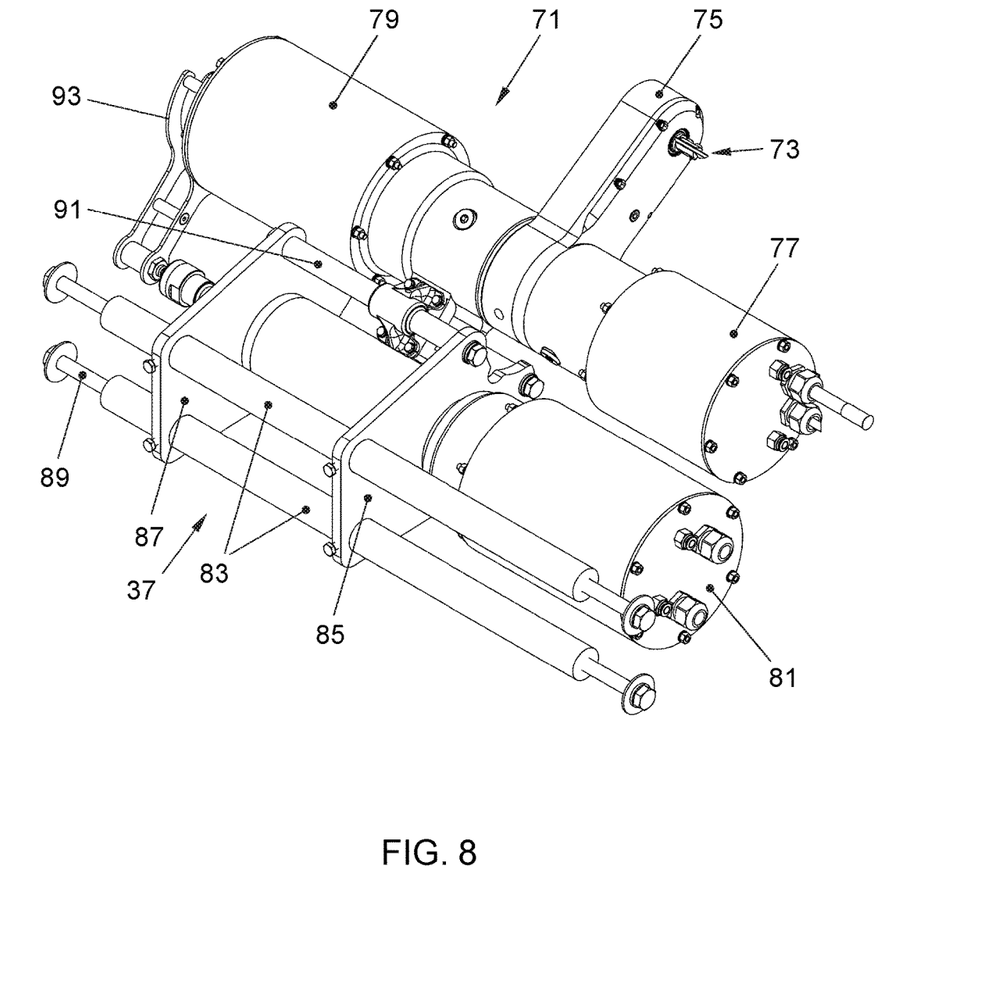
FIG. 8 is a secondary cutter unit.

As seen in FIGS. 7 and 8 the primary and secondary cutting units 35 and 37 are viewed from a downstream direction into an upstream direction, having regard to FIGS. 3 and 4. The primary cutting unit 35 in FIG. 7 is seen to have a linear actuator 81. The linear actuator 81 and the cutter drive unit 71 are both carried on a sub-frame that comprises a pair of transverse rods 83 and a pair of parallel sub-frame plates 85, 87. The sub-frame plates 85, 87 are parallel to one another and extend in a direction perpendicular to the pair of transverse rods 83. The transverse rods 83 are mounted in the leg cutting unit 1 by means of fasteners 89 in an otherwise conventional manner. Between the parallel sub-frame plates 85, 87 also a transverse guide 91 extends for guiding lateral movement of the cutter drive unit 71. The transverse guide 91 comprises two parallel rods, of which only one is fully visible in FIGS. 7 and 8. A bracket 93 is provided at the end of the housing of the arm drive mechanism 79 for further guiding and stabilizing the lateral movement of the cutter drive unit 71. Lateral movement of the cutter drive unit 71 is provided over a distance that is appropriate for the knife 73 to engage in, and to disengage from the leg meat without disturbing the bone inside the poultry leg.

The secondary cutting unit 37 of FIG. 8 is substantially identical to the primary cutting unit referred to in FIG. 7, and a further description would simply be repetitive.

FIG. 9 shows again the cutter drive unit 71 in slightly more detail. The arm drive mechanism 79 for angularly positioning of the arm 75 further comprises a bearing block 95, which contains a plug 97 for lubrication and inspection. The bearing block 95 also has a mounting protrusion 99 for connecting to the transverse guide 91 (shown in FIGS. 7 and 8). The arm drive mechanism 79 has a lid 101 on its outer end, which is fixed by means of fasteners 103. Arranged on the lid 101 are pneumatic connectors 105, and electrical connectors 107 for energizing the arm drive mechanism 79.

Figure 9:
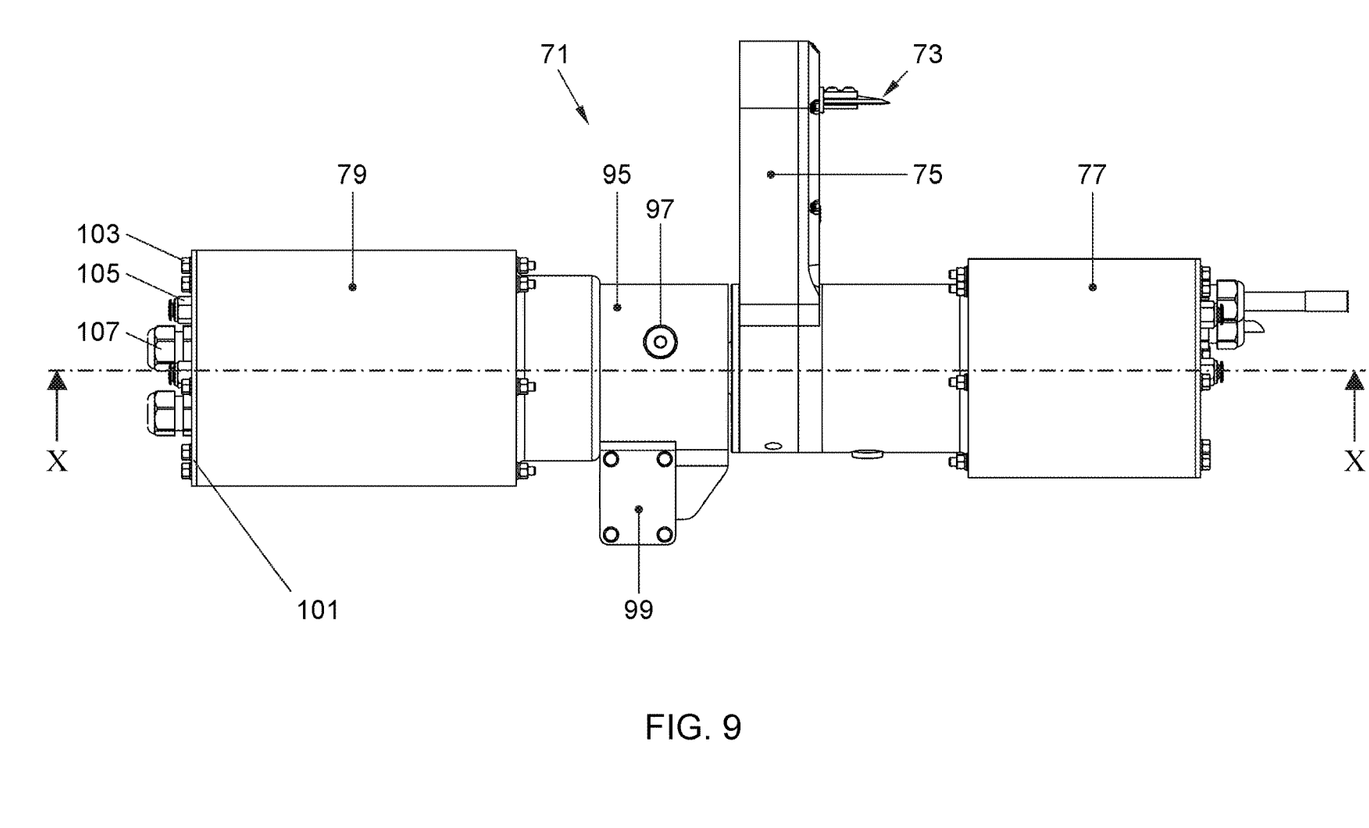
FIG. 9 is a side elevation of the cutter drive unit of FIG. 6.
Figure 10:
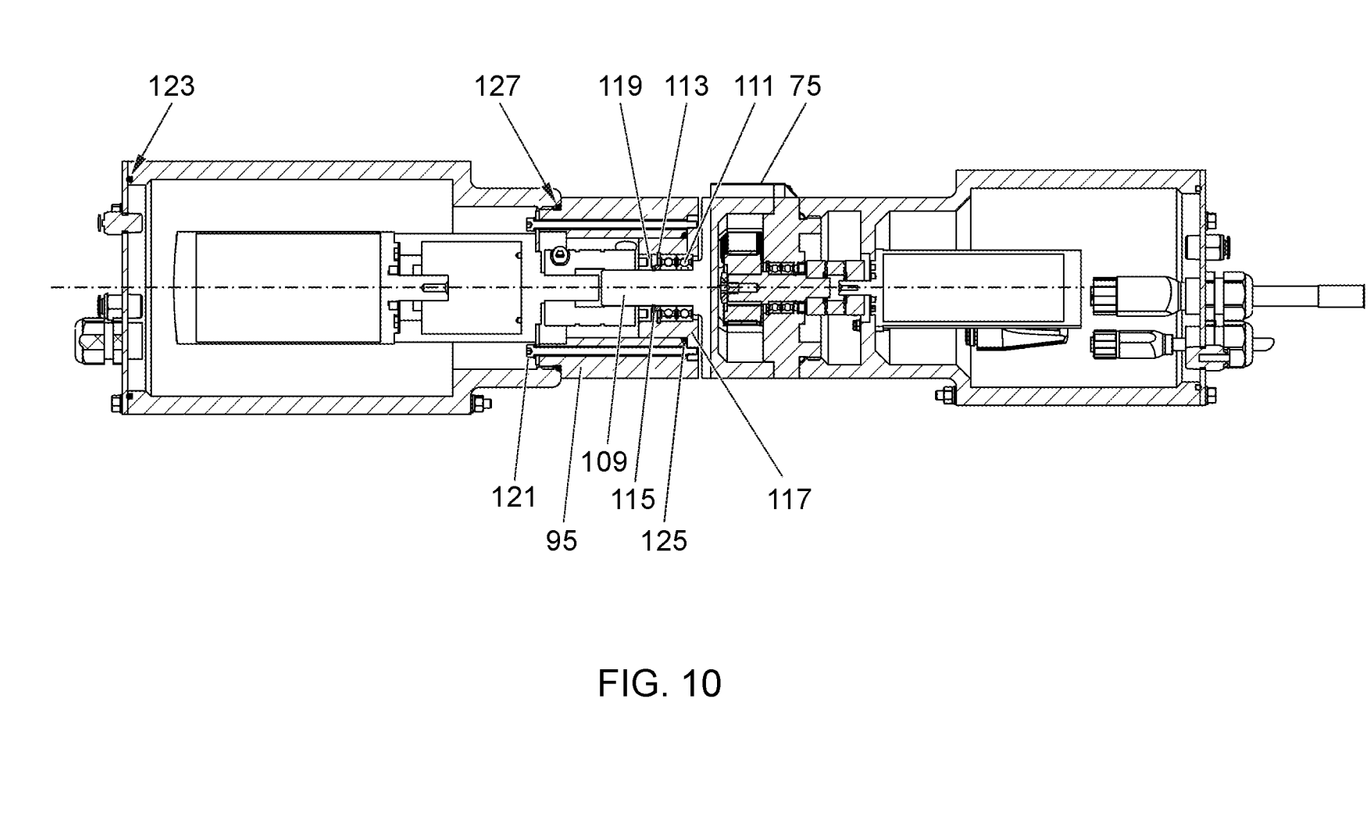
FIG. 10 is a cross section of the cutter drive unit along the line X-X indicated in FIG. 9.

A transverse cross section along the line X-X of FIG. 9 is shown in FIG. 10. In this cross section it is visible that a drive shaft 109 of the angularly movable arm 75 is journaled in ball bearings 111. The ball bearings 111 are retained by a locking ring 113, and a distance ring 115. The locking ring 113 is fitted to a bearing housing 117, while the distance ring surrounds the drive shaft 109. Also provided is a sealing ring 119 to ensure that lubrication grease is kept inside of the ball bearings 111. The bearing housing 117 is mounted in the bearing block 95 by means of screws 121. A generally fluid-tight sealing is obtained by O-rings 123, 125, 127.

Accordingly a method and apparatus (1, 11) are disclosed for longitudinally cutting poultry legs along a contour defined by an inwardly extending bone structure. The method comprises the steps of, and the apparatus 1, 11 having means 25 for, suspending at least one poultry leg at its ankle joint, and conveying the thus suspended poultry leg along a predefined path of conveyance 21. At least one cutting unit 1 with a directionable knife 73 is provided in the predefined path of conveyance 21. The at least one poultry leg is positioning such that it is lined-up for a longitudinal cutting engagement by the directionable knife 73, and the directionable knife 73 is brought into cutting engagement with the thus positioned poultry leg. During cutting engagement, position and cutting direction of the directionable knife are continuously adjusted to follow the contour defined by the bone structure of the poultry leg, while the positioned poultry leg is conveyed past the directionable knife 73.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. Method for longitudinally cutting poultry legs along a contour defined by an inwardly extending bone structure, wherein the method comprises the steps of:
    suspending at least one poultry leg at its ankle joint;
    conveying the suspended at least one poultry leg along a predefined path of conveyance;
    providing at least one cutting unit, having a directionable knife in the predefined path of conveyance;
    positioning the at least one poultry leg such that it is lined-up for a longitudinal cutting engagement by the directionable knife;
    bringing the directionable knife into cutting engagement with the at least one poultry leg;
    continuously adjusting position and cutting direction of the directionable knife to follow the contour defined by the bone structure of the at least one poultry leg while conveying the positioned at least one poultry leg past the directionable knife.

2. Method according to claim 1, wherein adjusting the directionable knife comprises angularly rotating the directionable knife such that a cutting edge of the directionable knife follows an angular direction at which the bone structure extends within the at least one poultry leg.

3. Method according to claim 1, wherein the directionable knife is moved laterally in respect of the predefined path of conveyance in a direction towards and into the at least one poultry leg to achieve cutting engagement with the at least one poultry leg.

4. Method according to claim 1, wherein the directionable knife is moved linearly and perpendicular to the path of conveyance to meet the bone structure.

5. Method according to claim 1, wherein the at least one poultry leg is positioned horizontally and the directionable knife is adjusted vertically.

6. Method according to claim 1, wherein the at least one poultry leg is suspended from a shackle, and wherein the at least one poultry leg is pivoted around its ankle joint inside the shackle for the positioning thereof.

7. Method according to claim 6, comprising the step of guiding the shackle along the path of conveyance preventing lateral movement of the shackle during the positioning the at least one poultry leg.

8. Apparatus for longitudinally cutting poultry legs along a contour defined by an inwardly extending bone structure comprising:
- suspension means for suspending at least one poultry leg at its ankle joint;
- a conveyor for conveying the at least one poultry leg suspended by the suspension means along a path of conveyance towards at least one cutting unit;
- the at least one the cutting unit comprising a directionable knife;
- at least one leg guide for lining the at least one poultry leg up for cutting engagement by the directionable knife; and
- the directionable knife being arranged for following the contour defined by the bone structure, when the at least one poultry leg is conveyed past the directionable knife.

9. Apparatus according to claim 8, wherein the directionable knife is angularly rotatable effective for a cutting edge of the directionable knife to follow an angular direction at which the bone structure extends within the at least one poultry leg.

10. Apparatus according to claim 8, wherein the directionable knife is arranged on a pivoting arm connected to an arm drive mechanism, and wherein the directionable knife extends from a lateral side of pivoting arm.

11. Apparatus according to claim 8, wherein the at least one cutting unit is connected to a linear actuator arranged for moving the at least one cutting unit and thereby the directionable knife linearly and perpendicular to the path of conveyance.

12. Apparatus according to claim 8, wherein the at least one leg guide is arranged for positioning the at least one poultry leg horizontally, and wherein the directionable knife is arranged for being vertically adjustable to meet the horizontally positioned at least one poultry leg.

13. Apparatus according to claim 8, wherein the suspension means include a shackle, and wherein the shackle is arranged for carrying the at least one poultry leg and permitting the at least one poultry leg to be pivotable about its ankle joint when carried by the shackle.

14. Apparatus according to claim 13, wherein the shackle comprises a vertical shaft, and wherein the vertical shaft is guided between opposite shackle guides for preventing lateral movement of the shackle when positioning the at least one poultry leg.

15. Apparatus according to claim 8, wherein the at least one leg guide comprises an entrance guide rod arranged for being resiliently biased towards an opposite guide plate for, in use, exerting a positioning force against the at least one poultry leg.

16. Apparatus according to claim 15, wherein the at least one leg guide comprises first and second leg guides arranged for respectively receiving a first and second poultry leg, and wherein each of the first and second leg guides is associated with a respective primary and a secondary cutting unit downstream of one another in the path of conveyance.

17. Apparatus according to claim 16, wherein the secondary cutting unit is positioned downstream of the primary cutting unit at a pitch distance equal to at least a spacing between successive shackles of the conveyor.

18. Apparatus according to claim 8, wherein the at least one cutting unit comprises a cutter drive unit for rotating the angularly rotatable knife.

19. Apparatus according to claim 18, wherein the at least one cutting unit comprises an angularly movable arm, which angularly movable arm has the angularly rotatable knife positioned at a distal end thereof, and wherein an arm pivot drive mechanism is arranged for angularly pivoting the arm.

20. Apparatus according to claim 18, wherein the at least one cutting unit is carried on a sub-frame for lateral movement transverse to the path of conveyance, and comprises a linear actuator also carried on the sub-frame for achieving, in use, cutting engagement of the directionable knife with the at least one poultry leg.

21. Apparatus according to claim 18, wherein the at least one cutting unit is one of a primary and a secondary cutting units, which are arranged downstream of one another in the path of conveyance.

\* \* \* \* \*